US008503455B2

(12) United States Patent
Heikens

(10) Patent No.: US 8,503,455 B2
(45) Date of Patent: Aug. 6, 2013

(54) METHOD FOR FORWARDING PACKETS A RELATED PACKET FORWARDING SYSTEM, A RELATED CLASSIFICATION DEVICE AND A RELATED POPULARITY MONITORING DEVICE

(75) Inventor: Heico Heikens, Antwerp (BE)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/335,844

(22) Filed: Dec. 16, 2008

(65) Prior Publication Data
US 2009/0154477 A1    Jun. 18, 2009

(30) Foreign Application Priority Data

Dec. 17, 2007    (EP) .................................... 07291545

(51) Int. Cl.
*H04L 12/56*    (2006.01)

(52) U.S. Cl.
USPC ..................................................... 370/395.21

(58) Field of Classification Search
USPC ................... 370/395.21, 395.2, 401
See application file for complete search history.

(56) References Cited

U.S. PATENT DOCUMENTS

| | | | |
|---|---|---|---|
| 5,621,454 A * | 4/1997 | Ellis et al. ........................ | 725/22 |
| 6,728,775 B1 | 4/2004 | Chaddha | |
| 7,009,937 B2 * | 3/2006 | Miyamoto ..................... | 370/229 |
| 7,260,601 B1 | 8/2007 | Day et al. | |
| 7,681,101 B2 * | 3/2010 | Oran et al. ...................... | 714/748 |
| 2002/0131428 A1 * | 9/2002 | Pecus et al. .................... | 370/401 |
| 2004/0114576 A1 * | 6/2004 | Itoh et al. ....................... | 370/352 |
| 2006/0146703 A1 | 7/2006 | Cha et al. | |
| 2006/0244839 A1 * | 11/2006 | Glatron et al. ............ | 348/211.11 |
| 2006/0268871 A1 * | 11/2006 | Van Zijst ....................... | 370/390 |
| 2007/0206592 A1 * | 9/2007 | Itakura et al. ................. | 370/389 |
| 2007/0255829 A1 * | 11/2007 | Pecus et al. .................... | 709/225 |
| 2007/0268823 A1 * | 11/2007 | Madison et al. .............. | 370/229 |
| 2008/0069125 A1 * | 3/2008 | Reed et al. ..................... | 370/410 |
| 2008/0133767 A1 * | 6/2008 | Birrer et al. ................... | 709/231 |
| 2008/0195461 A1 * | 8/2008 | Li et al. ........................... | 705/10 |
| 2008/0256409 A1 * | 10/2008 | Oran et al. ..................... | 714/748 |
| 2009/0100478 A1 * | 4/2009 | Craner et al. ................... | 725/87 |
| 2009/0303997 A1 * | 12/2009 | Zijst .............................. | 370/390 |

FOREIGN PATENT DOCUMENTS

| | | |
|---|---|---|
| EP | 1 284 576 A2 | 2/2003 |
| WO | WO 01/31605 A1 | 5/2001 |
| WO | WO 2005/084031 A1 | 9/2005 |

OTHER PUBLICATIONS

European Search Report.

* cited by examiner

*Primary Examiner* — Jay P Patel
(74) *Attorney, Agent, or Firm* — Fay Sharpe LLP

(57) ABSTRACT

The present invention relates to a method and related system and related devices for forwarding packets of a plurality of multimedia streams where the packets of the plurality of multimedia streams being forwarded from a multimedia source towards a plurality of multimedia endpoints over a communications network, where the method comprises a step of classifying the packets of the plurality of multimedia streams based on the usage of each of the multimedia streams.

17 Claims, 1 Drawing Sheet

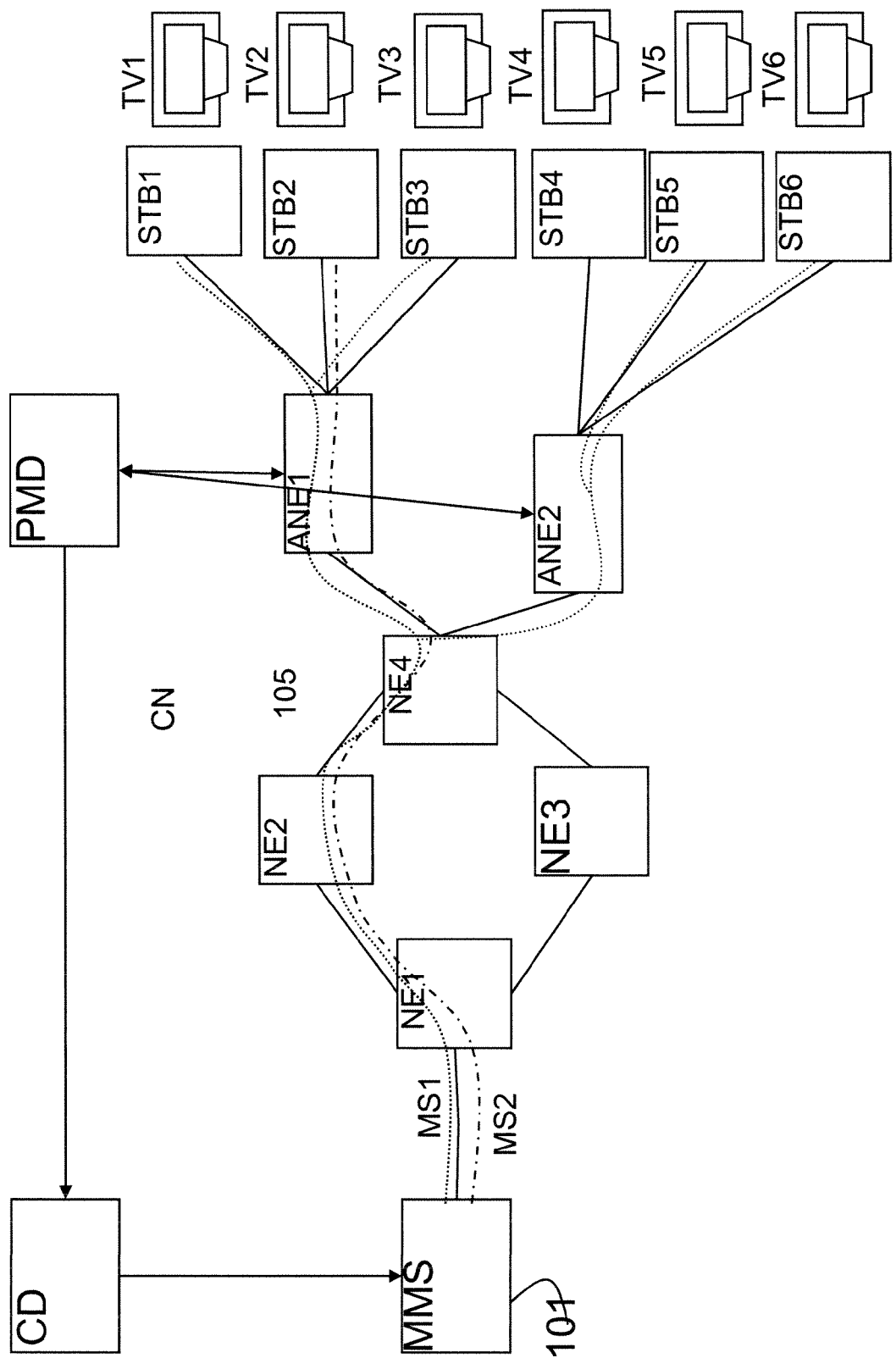

METHOD FOR FORWARDING PACKETS A RELATED PACKET FORWARDING SYSTEM, A RELATED CLASSIFICATION DEVICE AND A RELATED POPULARITY MONITORING DEVICE

BACKGROUND OF THE INVENTION

The present invention relates to a Method for forwarding packets according to the preamble of claim 1, the Packet forwarding system according to the preamble of claim 6, and classification device according to the preamble of claim 8.

Such a Method for forwarding packets of a plurality of multimedia streams and a related system is already known in the art, e.g. from "U.S. Pat. No. 6,728,775". Therein, is disclosed that with layered coding of multimedia streams such as video streams, the multimedia stream is divided into sub-bit-streams, which have a reduced bit-rate. Typically there will be a base layer further referred to as multimedia base-stream and one or two enhancement layers, further referred to as multimedia enhancement streams The basic layer contains the minimum amount of data to decode the video stream and suitable for providing a basic multimedia quality to an end-user further referred to as multimedia endpoint. One or more enhancement layers are added to enhance the video quality provisioning the end-user with information for decoding and viewing the multimedia stream with an improved multimedia quality.

With primary traffic management, these enhancement bit-streams are classified to be less important. In addition routers and switches, further referred to as network elements of the communication network may react to temporary network congestion by dropping the less important packets from the stream. The less important packets from the stream, are the packets of the respective first and further enhancement bit-streams where the first enhancements stream is ranked higher in priority than a further enhancement stream.

Disadvantageously, from the network's perspective, the scheme of traffic management method for packet classifying is inefficient for the overall user experience. As a consequence the network will in case of congestion randomly drop the less important multimedia stream packets of all of the multimedia streams meaning that all end-users experience a degraded service.

SUMMARY OF THE INVENTION

An object of the present invention is to provide a method for forwarding packets of a plurality of multimedia streams, a packet forwarding system of the above known type but wherein a more efficient scheme of packet classification for the overall end-user experience is provided and hence the impact experienced over all end-user on average is reduced in case of packet discard due to congestion in the network.

According to the invention, this object is achieved by the method for forwarding packets according to claim 1, the Packet forwarding system according to claim 6, the classification device according to claim 8 and the Popularity monitoring device according to claim 10.

Indeed, by not only classifying the packets of the multimedia streams based on the importance of the streams but instead classifying based on the usage of each of the multimedia data streams, the packets are classified in such way that packets of multimedia streams most watched have a higher priority than streams less or not being used by any of the clients.

If, in case of congestion in the communications network, the packets of multimedia data streams being classified as little used or non popular are discarded only few clients are impacted by discarding packets of the non used or non popular multimedia data streams. Now the majority of multimedia endpoints watching the much used or high popular multimedia data streams are not impacted by the discarding packets in the low use multimedia data streams.

Another characterizing embodiment of the present invention is described in claim 2, claim 7 and claim 9.

By classifying the packets of the plurality of multimedia data streams first based on the usage of each of the multimedia data streams and subsequently based on the importance of the stream, in case a first and further enhancement stream having a lower importance than the base streams the classifying is done even more efficient. By classifying packets of the plurality of multimedia data streams based on the usage of each of the multimedia streams and additionally based on the importance of each of the streams, in case of congestion packets can be discarded in such way that only enhancement streams related to multimedia streams having a low popularity are impacted. Hence, multimedia end points using a low popular multimedia streams are only impacted to an extent that packets of the related enhancement streams are discarded and still a base quality of multimedia is provided meaning that only an degraded service is experienced by this small group of clients.

Another characterizing embodiment of the present invention is described in claim 3 and claim 11.

The usage of each of the streams is determined through monitoring the overall use at each multimedia endpoint of said plurality of multimedia endpoints.

Another characterizing embodiment of the present invention is described in claim 4 and claim 12.

The usage of each of the streams is determined based on statistics on the use each of the streams by the connected multimedia endpoints, maintained at the access network element, retrieved at an access network element.

An additional characterizing embodiment of the present invention is described in claim 5.

Further characterizing embodiments of the present method for forwarding packets are mentioned in the appended claims.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

DESCRIPTION OF THE DRAWINGS

The above and other objects and features of the invention will become more apparent and the invention itself will be best understood by referring to the following description of an embodiment taken in conjunction with the accompanying drawings wherein:

FIG. 1 represents a packet forwarding system according to the present invention.

DETAILED DESCRIPTION

In the following paragraphs, referring to the drawing, a packet forwarding system will be described wherein an implementation of the method according to the present invention is executed.

In the first paragraph the elements of the network in the figure are described, in the second paragraph, the interconnections between all before described Network elements are defined and in a later paragraph the actual execution of the packet forwarding system and related method will be described.

The Packet forwarding system for forwarding packets of a plurality of Multimedia streams of the present invention first comprises, a multimedia source MMS that is adapted to forward a plurality of multimedia streams towards a plurality of multimedia endpoints STB1 . . . STB6, a plurality of multimedia endpoints STB1 . . . STB6, a plurality of network elements for forwarding packets of a stream, a plurality of network access elements ANE1, ANE2, a classification device CD and a popularity monitoring device PMD.

The first relevant element is the multimedia source MMS that is adapted to forward a plurality of multimedia streams MS1, MS2 towards a plurality of multimedia endpoints STB1 . . . STB6. This Multimedia source MMS typically is a video server or head-end.

Such a multimedia stream may be a video-stream, audio stream or data-stream. A multimedia endpoint STB1 . . . STB6 is adapted to receive a multimedia stream from a plurality of multimedia streams typically is a set-top-box STB for connecting to an end-users Television and providing a multimedia stream to the end-users television.

The system further comprises plurality of network elements NE1 . . . NE4 for forwarding the multimedia packet streams from the multimedia source towards each of the multimedia endpoints STB1 . . . STB6. Each of the network elements for instance may be a router, a switching device, a gateway or a data-plane technology.

The communication network CN of the present embodiment comprises a plurality of access network elements ANE1, ANE2 each forming part of an access network and for instance being adapted to multiplex the multimedia streams to each of the connected multimedia endpoints STB1 . . . STB6. The system further comprises a classification device CD that is able to classify the packets of each of the multimedia streams. The Popularity monitoring device PMD is a device for determining the popularity of each of the multimedia streams and has access to the access network element for retrieving information on the use of each of the multimedia streams, either directly at the access network element or via the access network elements for retrieving the information at each of the multimedia endpoints STB1 . . . STB6.

The multimedia source MMS is coupled to each of the plurality of multimedia endpoints STB1 . . . STB6 over the communications network CN comprising the plurality of network elements NE1 . . . NE4 and one of the access network elements ANE1, ANE2.

The classification device CD is coupled to the multimedia Source MMS over a control-Link such as IP-link, and further coupled to the Popularity monitoring device PMD over a control-link such as an IP-link.

The popularity monitoring device PMD further, in one embodiment, is coupled to the access network elements ANE1, ANE2 In order to explain the execution of the present invention it is assumed that a plurality of multimedia streams are forwarded from the multimedia source MMS towards a plurality of multimedia endpoints STB1.STB6, in this embodiment each multimedia end point being a set-top-box with a connected television TV1 . . . TV6. Each of the multimedia streams MS1, MS2 and MS3 for instance respectively carrying video and audio information on a football match, a music program and an art program.

Each of the multimedia streams MS1, MS2, MS3 is forwarded through the communications network CN towards the selecting multimedia end-points STB1 . . . STB6. The multimedia streams are forwarded by each of the network elements NE1 . . . NE4 towards the access network elements that select the multimedia streams and forward the selected stream towards the selecting multimedia endpoint STB1 . . . STB6. For instance Multimedia stream MS1 being the football match which is being watched by a majority of users, i.e. at multimedia end-point STB1, STB3, STB5 and STB6. The packets of multimedia stream MS1 are forwarded through network elements NE1, NE2, NE4, ANE1 and ANE2 towards selecting endpoints STB1, STB3, STB5 and STB6. The multimedia stream MS2 carrying a music program is only selected and being watched at multimedia endpoint STB2 and the multimedia stream MS3 carrying an art program is only selected and being watched at multimedia endpoint STB4 (not shown). The packets of multimedia stream MS2 are forwarded through network elements NE1, NE2, NE4 ANE1, and ANE2 towards selecting endpoint STB2 and the packets the packets of multimedia stream MS3 are forwarded through network elements NE1, NE2, NE4 and ANE2 towards selecting endpoint STB4.

Due to the low use of both multimedia streams MS2 and MS3, both multimedia streams MS2 and MS3 are classified by the classification part CP of the classification device CD according to a lower priority.

In case of congestion at for instance the link between network elements NE2 and NE4, network element NE4, in order to mitigate consequences of congestion discards packets of the packet streams to be forwarded by network element NE4. In discarding packets, the packet discarding is done randomly. This has an effect on all users of the network as packets of all streams are discarded impacting all streams and hence all users which is disadvantageous.

Additionally, if the monitoring part MP of the popularity monitoring device determines the usage of each of said multimedia streams this information can be used for classifying the multimedia streams based on the usage of each of the streams. By classifying the packets of the multimedia streams based on the usage of each of the multimedia data streams, the packets are classified in such way that packets of multimedia streams most watched have a higher priority than streams less or not being used by any of the clients.

If, in case of congestion in the communications network, the packets of multimedia data streams being classified as little used or non popular are discarded only few clients are impacted by discarding packets of the non used or non popular multimedia data streams. Now the majority of multimedia endpoints watching the much used or high popular multimedia data streams is not impacted by the discarding packets in the low use multimedia data streams.

The monitoring part MP of the popularity monitoring device MPD is able to determine the usage of each of the multimedia streams by monitoring the overall use at each multimedia endpoint of said plurality of multimedia endpoints STB1 . . . STB6, and the PMD can obtain usage information either from the network elements ANE1, ANE2 or direct from the end-points.

Alternatively, the monitoring part MP of the popularity monitoring device is able to determine the usage of each of the multimedia streams based on statistics with respect to the usage of the different streams at each of the multimedia endpoints and being collected and maintained at each of the access network elements ANE1, ANE2 that can be retrieved, by the popularity monitoring part, from the respective access network elements ANE1, ANE2 coupling each of the multimedia endpoints to the communications network.

The classification device CD in turn comprises a classification part CP that is adapted to classify the packets of the plurality of multimedia streams based on the usage of each of said multimedia streams as determined by the monitoring part MP of the popularity monitoring device.

In the concrete, the monitoring part MP of the popularity monitoring device determines the usage of each of the multimedia streams based on statistics that can be retrieved, by the popularity monitoring part, from the respective access network elements ANE1, ANE2. Hence the monitoring part MP determined that MS1 is a highly popular multimedia stream and that both multimedia streams MS2 and MS3 are only less frequently being used. This information on the usage of each of the multimedia streams is forwarded to the Classifying device CD in this embodiment located in or near the multimedia source MS so that the classifying part CP of the classifying device CD at receipt of the use information can classify the packets of each of the streams. Hence all packets of stream MS1 are classified as high priority and further all packets of the multimedia stream s MS2 and MS3 are classified as low priority.

Again, in case of congestion at for instance the link between network elements NE2 and NE4, network element NE4, in order to mitigate consequences of congestion, discards packets of the packet streams to be forwarded by network element NE4. In discarding packets, the packet discarding is done based on the classification performed by classification device CD where the classification is based on the determination of usage of each of the multimedia streams. Hence in discarding first the packets of the with low priority classified packets of multimedia streams MS2 and MS3 are discarded leaving the multimedia stream MS1 complete. As a consequence only the single user of the respective multimedia stream MS2 and or of multimedia stream MS3 is impacted leading to loss or low quality of the program while all users of multicast stream MS1 are not impacted at all hence experience no impact.

In an alternative embodiment, each of the multimedia streams of the plurality of multimedia streams MS1, MS2, MS3 comprises a base multimedia stream and one or two enhancement multimedia streams. The multimedia basestream contains the minimum amount of data to decode the video stream and suitable for providing a basic multimedia quality to an end-user further referred to as multimedia endpoint. One or more two multimedia enhancement streams added to enhance the video quality provisioning the end-user with information for decoding and viewing the multimedia stream with an improved multimedia quality. Still the monitoring part MP of the popularity monitoring device determines the usage of each of said multimedia streams for classifying the multimedia streams based on the usage of each of the streams.

Now it is assumed that each of the multimedia streams MS1, MS2, MS3 comprises a base multimedia streams and additionally to support a high quality two enhancement multimedia streams.

In this embodiment additional to the classifying the packets of the plurality of multimedia data streams MS1, MS2, MS3 based on the usage of each of the multimedia data streams MS1, MS2, MS3 and additionally based on the importance of the stream, in case a first and further enhancement stream having a lower importance than the base streams the classifying is done even more efficient. By classifying packets of the plurality of multimedia data streams based on the usage of each of the multimedia streams and additionally based on the importance of each of the streams, in case of congestion packets can be discarded in such way that only enhancement streams related to multimedia streams having a low popularity are impacted. Hence, multimedia end-points using a low popular multimedia streams are only impacted to an extent that packets of the related enhancement streams are discarded and still a base quality of multimedia is provided meaning that only an degraded service is experienced by this small group of clients.

In the concrete multimedia stream MS1 is a highly watched multimedia stream and hence the base multimedia stream is classified as high priority and corresponding enhancement streams are marked as equally important or possibly a priority class lower.

Alternatively, the monitoring part MP of the popularity monitoring device is able to determine the usage of each of the multimedia streams based on statistics with respect to the usage of the different streams at each of the multimedia endpoints and being collected and maintained at each of the access network elements ANE1, ANE2 that can be retrieved, by the popularity monitoring part, from the respective access network elements ANE1, ANE2 Hence the monitoring part MP determined that MS1 is a highly popular multimedia stream and that both multimedia streams MS2 and MS3 are only infrequently being used. This information on the usage of each of the multimedia streams again is forwarded to the Classifying device in this embodiment located in or near the multimedia source MS so that the classifying part CP of the classifying device CD at receipt of the use information can classify the packets of each of the streams.

The classification of the packets in this embodiment first is based on the determination of usage of each of the multimedia streams and subsequently based on the importance of the streams.

Hence all packets of multimedia base stream MS1 are classified as high priority and further all packets of the multimedia base streams MS2 and MS3 are classified as middle priority.

The first and second enhancement multimedia streams of multimedia stream MS1 are classified between the highest and middle priority class and the first and second enhancement multimedia streams of multimedia stream MS2 and MS3 are respectively classified between middle and lowest priority.

Again, in case of congestion at for instance the link between network elements NE2 and NE4, network element NE4, in order to mitigate consequences of congestion discards packets of the packet streams to be forwarded by network element NE4. In discarding packets, the packet discarding is done based on the classification performed by classification device CD which first is based on the determination of usage of each of the multimedia streams and subsequently based on the importance of the streams. Hence in discarding first the packets of with low priority classified packets of second enhancement multimedia streams of multimedia streams MS2 and MS3 are discarded first leaving the multimedia stream MS1 complete but also the base multimedia streams and possibly also the first enhancement multimedia a streams of multimedia stream MS2 and MS3. As a consequence only the single user of the respective multimedia stream MS2 and/or of multimedia stream MS3 is impacted in that the program is only received in base quality instead of high quality while all users of multicast stream MS1 are not impacted at all hence still experience maximum quality of program.

It is to be noted that the forwarding of multimedia streams may be multicasting in an Internet Protocol network or be broadcasting in an Ethernet network.

For simplicity sake only a restricted number of multimedia endpoints, a restricted number of multimedia streams of network elements etc is presented although a system of our invention comprises a multiple of multimedia endpoints a large amount of multimedia streams forwarded etc.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. A method for forwarding packets of a plurality of multimedia streams, said packets of said plurality of multimedia streams being forwarded from a multimedia source towards a plurality of multimedia endpoints over a communications network, wherein said method comprise:
    determining the usage of each of said multimedia streams via a popularity monitoring device;
    classifying said packets of said plurality of multimedia streams based on said usage of each of said multimedia streams, wherein said step of classifying is performed via a classification device that is coupled to said multimedia source and said popularity monitoring device, wherein said classification device is coupled to said multimedia source over a first control link and is further coupled to the said popularity monitoring device over a second control link; and
    discarding some of said packets of said plurality of multimedia streams based on said classifying of said packets.

2. The method for forwarding packets according to claim 1, wherein each multimedia stream of said plurality of multimedia streams comprises a base multimedia stream and at least one enhancement multimedia stream and in that said step of classifying additionally is based on the importance of each of said base multimedia stream and at least one enhancement multimedia stream of said multimedia streams.

3. The method for forwarding packets according to claim 1, wherein said usage is determined through monitoring the overall use at each multimedia endpoint of said plurality of multimedia endpoints.

4. The method for forwarding packets according to claim 1, wherein said usage is determined based on statistics retrieved at an access network element.

5. The method for forwarding packets according to claim 1, wherein said packet discarding is first based on a determination of usage of each of said plurality of multimedia streams and is next based on a given priority of each of said plurality of multimedia streams.

6. The method according to claim 1, further comprising: using a monitoring part of said popularity monitoring device to determine the usage of each of said plurality of multimedia streams by monitoring overall use at each multimedia endpoint of said plurality of multimedia endpoints and obtaining usage information either from one or more network elements or directly from said multimedia endpoints.

7. The method according to claim 1, further comprising:
    using a popularity monitoring part of said popularity monitoring device to determine the usage of each of said multimedia streams based on statistics with respect to the usage of the different multimedia streams at each of said multimedia endpoints and being collected and maintained at each of a plurality of access network elements coupling each of the multimedia endpoints to said communications network, wherein the usage is retrieved by said popularity monitoring part from each of said plurality of access network elements.

8. A packet forwarding system for forwarding packets of a plurality of Multimedia streams, said system comprising:
    a multimedia source adapted to forward said plurality of multimedia streams towards a plurality of multimedia endpoints over a communications network coupling said multimedia source and said plurality of multimedia endpoints;
    a popularity monitoring part that determines the usage of each of said multimedia streams; and
    a classification part, coupled to the multimedia source and to the monitoring part, that classifies said packets of said plurality of multimedia streams based on the usage of each of said multimedia streams, wherein said classification part is coupled to said multimedia source over a first control link and is further coupled to the said popularity monitoring device over a second control link.

9. The packet forwarding system according to claim 8, wherein each multimedia stream of said plurality of multimedia streams comprises a multimedia base stream and at least one enhancement stream and said classification part classifies said packets based on the importance of each of said multimedia streams.

10. The system according to claim 8, wherein said monitoring part is configured to determine the usage of each of said plurality of multimedia streams by monitoring overall use at each multimedia endpoint of said plurality of multimedia endpoints and said monitoring part is further configured to obtain usage information either from one or more network elements or directly from said multimedia endpoints.

11. The system according to claim 8, wherein said monitoring part is configured to determine the usage of each of said multimedia streams based on statistics with respect to the usage of said different multimedia streams at each of said multimedia endpoints and being collected and maintained at each of a plurality of access network elements coupling each of said multimedia endpoints to said communications network, wherein the usage is retrieved from each of said plurality of access network elements.

12. A classification device for use in a system for forwarding packets of a plurality of Multimedia streams, said system comprising a multimedia source that forwards said plurality of multimedia streams towards a plurality of multimedia endpoints over a communications network coupling said multimedia source and said plurality of multimedia endpoints, wherein said classification device comprises a classification part, coupled to said multimedia source and a popularity monitoring device, that classifies said packets of said plurality of multimedia streams based on the usage of each of said multimedia streams, wherein said classification part is coupled to said multimedia source over a first control link and is further coupled to the said popularity monitoring device over a second control link.

13. The classification device according to claim 12, wherein each said multimedia stream of said plurality of multimedia streams comprises a base multimedia stream and at least one enhancement multimedia stream; and said classification part classifies said packets of said plurality of streams based on the importance of each of said base multimedia stream and at least one enhancement multimedia stream of said multimedia streams.

14. A popularity monitoring device for use in a system for forwarding packets of a plurality of Multimedia streams, said system comprising a multimedia source adapted to forward said plurality of multimedia streams towards a plurality of multimedia endpoints over a communications network coupling said multimedia source and said plurality of multimedia endpoints where said popularity monitoring device comprises a monitoring part that determines the usage of each of said multimedia streams, wherein said popularity monitoring device is operative to send information relating to the usage of each of said multimedia streams to a classification part that is coupled to said multimedia source over a first control link and is further coupled to the said popularity monitoring device over a second control link.

15. The popularity monitoring device according to claim 14, wherein said monitoring part monitors the overall use at each multimedia endpoint of said plurality of multimedia endpoints.

16. The popularity monitoring device according to claim 14, wherein said monitoring part determines said usage is based on statistics retrieved at an access network element.

17. The popularity monitoring device according to claim 14, wherein said popularity monitoring part of said popularity monitoring device is configured to determine the usage of each of said multimedia streams based on statistics with respect to the usage of the different multimedia streams at each of said multimedia endpoints and being collected and maintained at each of a plurality of access network elements coupling each of the multimedia endpoints to said communications network, wherein the usage is retrieved by said popularity monitoring part from each of said plurality of access network elements.

* * * * *